United States Patent [19]

Epple et al.

[11] Patent Number: 5,852,122
[45] Date of Patent: Dec. 22, 1998

[54] HYDROXYL-FUNCTIONAL COPOLYMERS OF LOW MOLAR MASS WITH SUBSTANTIAL SIDE-CHAIN BRANCHING, PROCESS FOR THEIR PREPARATION, AND THEIR USE

[75] Inventors: Ulrich Epple; Uwe Kubillus, both of Wiesbaden; Harald Oswald, Hofheim, all of Germany

[73] Assignee: Hoechst Aktiengesellschaft, Frankfurt am Main, Germany

[21] Appl. No.: 641,734

[22] Filed: May 2, 1996

[30] Foreign Application Priority Data

May 2, 1995 [DE] Germany ............ 195 15 919.5

[51] Int. Cl.$^6$ ..................................... C08F 8/00
[52] U.S. Cl. ................. 525/191; 528/361; 428/424.2; 428/424.4
[58] Field of Search ............... 528/361; 525/191; 428/424.2, 424.4

[56] References Cited

U.S. PATENT DOCUMENTS

| | | | |
|---|---|---|---|
| 4,145,513 | 3/1979 | Dalibor | 528/75 |
| 4,350,809 | 9/1982 | Fischer et al. | 528/361 |
| 4,565,730 | 1/1986 | Poth et al. | 428/204 |
| 4,710,556 | 12/1987 | Plum | 526/273 |
| 5,098,956 | 3/1992 | Blasko et al. | 525/123 |
| 5,126,170 | 6/1992 | Zwiener et al. | 427/385.5 |
| 5,214,086 | 5/1993 | Mormile et al. | 524/237 |

FOREIGN PATENT DOCUMENTS

| | | |
|---|---|---|
| 2084444 | 6/1993 | Canada . |
| 2106048 | 3/1994 | Canada . |
| 0 398 387 | 11/1990 | European Pat. Off. . |
| 0 408 858 | 1/1991 | European Pat. Off. . |
| 0 635 523 | 1/1995 | European Pat. Off. . |
| 0 638 591 | 2/1995 | European Pat. Off. . |
| 0 705 853 | 4/1996 | European Pat. Off. . |
| 4324801 | 4/1982 | Germany . |
| 43214801 | 1/1995 | Germany . |
| 44 15 319 | 11/1995 | Germany . |
| 44 42 769 | 6/1996 | Germany . |
| 92/22618 | 12/1992 | WIPO . |

OTHER PUBLICATIONS

Robinson et al., "High Performance Polyurethane Coating Systems Utilizing Oxazolidine Based Reactive Diluents", Waterborne Higher–Solids and Powder coatings Symposium, pp.439–458, (Feb. 1994).

Primary Examiner—Duc Truong
Attorney, Agent, or Firm—Foley & Lardner

[57] ABSTRACT

Low molar mass copolymers which can be prepared by reacting one or more glycidyl esters of saturated aliphatic monocarboxylic acids having a tertiary or quaternary α carbon atom, and at least two unsaturated copolymerizable monomers of which at least one has at least one COOH group, under the conditions of a free-radical copolymerization, whereby the weight-average molar mass of the copolymers is below 3500 g/mol and the proportion of branched side chains in the copolymer is at least 20% by mass are disclosed. Also disclosed are methods of making these copolymers and the use thereof in binder and coating systems.

4 Claims, No Drawings

HYDROXYL-FUNCTIONAL COPOLYMERS OF LOW MOLAR MASS WITH SUBSTANTIAL SIDE-CHAIN BRANCHING, PROCESS FOR THEIR PREPARATION, AND THEIR USE

BACKGROUND OF THE INVENTION

1. Field of the Invention

The invention relates to low molar mass copolymers which can be prepared by reacting (i) one or more glycidyl esters of saturated aliphatic monocarboxylic acids having a tertiary or quaternary α carbon atom, and (ii) at least two unsaturated copolymerizable monomers of which at least one comprises at least one COOH group, under the conditions of a free-radical copolymerization, wherein the weight-average molar mass of the copolymers is below 3500 g/mol and the proportion of branched side chains in the copolymer is at least 20% by mass. These low molar mass copolymers are useful in binder systems that are environmentally desirable and are universally useful in pigmented and unpigmented systems.

2. Description of Related Art

Acrylate resins are polymers whose use typically is exemplified in coatings technology as binders for weather-resistant, transparent clearcoats and pigmented coating materials. They also are widely used as a base material in the industry of adhesives and sealing compositions, including fillers. The systems currently employed usually have a high content of solvents on application. To safeguard the environment, the objective usually has been to reduce the emissions of organic compounds, specifically, to reduce the amount of solvent.

In order to obtain high-solids coating systems, adhesives and sealing compounds, these acrylate resins must be used at low viscosity, i.e. with low molar masses. It is well known that polymers of low viscosity can be prepared using free-radical solution polymerization, with or without the use of regulators, or bulk polymerization (see, for example, EP-A-0 408 858, EP-A-0 398 387, U.S. Pat. No. 4,145,513, U.S. Pat. No. 4,350,809, U.S. Pat. No. 4,710,556, EP-A-0 635 523, and DE-P 4442769). It also is known that products having drying properties, freedom from tack, chemical resistance and pigment wetting properties comparable with those of current systems can be obtained with specific, sterically bulky monomers (EP-A-0 638 591, DE-P 4415319, DE-P 4435950).

A disadvantage with these known systems is that the specific monomers used therein are currently still expensive, and therefore such systems are usually only employed where there is statutory pressure (e.g. VOC (volatile organic compounds) regulations in the U.S.A. and Great Britain and "TA Luft" [German air pollution control regulations] in Germany). This country-specific statutory pressure is exerted with varying degrees of strength in different countries. The evaluations permitted by the statutory authority in this context are different (individual considerations, combined considerations), which impel the supplier of such coating, adhesive and/or sealing products to provide new and different levels of technical performance. This has reached the point, however, where the usually high performance level of such products must, for environmental reasons, be cut back to a minimum level.

Clearcoats as unpigmented systems, usually are used, for example, in automotive refinishing as the topmost coat. Their function is to protect the pigmented, lower coat (basecoat) against mechanical stress, against the effects of weather and against dirt, and to provide the overall coating system with the necessary gloss. These clearcoats have predominantly been formulated using polymeric binders which in most cases have, at the same time, also been used as pigmented topcoats. The strict VOC regulations, however, force the manufacturer of raw materials to formulate these clearcoats separately, in some cases with the addition of low molar mass polyols, as "blend systems" (see, for example, EP-A-0 588 314, EP-A-0 129 124 and U.S. Pat. No. 5,098,956).

EP-A-0 588 314 describes a coating composition which is based on a mixture of poly(meth)acrylate polyols and comprises component A, having a weight-average molar mass $M_w$ of from 3000 to 5000 g/mol (gel permeation chromatography, polystyrene as standard), and component B, having a weight-average molar mass $M_w$ of from 5000 to 8000 g/mol. The blend components of EP-A-0 588 314 differ considerably in their structural composition from the poly(meth)acrylatepolyol components of the present invention.

EP-A 0 129 124 describes a coating composition which comprises two acrylate polymers A and B as binders, and aliphatic and/or cycloaliphatic polyisocyanates. Copolymer A is an acrylate copolymer having a weight-average molar mass of from 800 to 4000 g/mol, an OH number of from 80 to 180 mg/g and a glass transition temperature of below −10° C. Copolymer B is a methacrylate copolymer having a weight-average molar mass of from 3000 to 10,000 g/mol, an OH number of from 40 to 120 mg/g and a glass transition temperature of from −10° C. to +70° C. The copolymers A and B described in this document are prepared in solvents. In sharp contrast, the blend components employed in this invention are bulk polymers having a built-in monomer unit which forms during polymerization, which is not described in EP-A 0 129 124.

U.S. Pat. No. 5,098,956 describes polyol blends containing an acrylate copolymer component, which have a low glass transition temperature (from about −10° C. to about 20° C.), an OH number from about 112 to 187 mg/g and a number-average molar mass $M_n$ of from about 1500 to 6000 g/mol, with a polydispersity $U=M_w/M_n$ of less than or equal to about 5. The blends also include an acrylate copolymer component which exhibits a high glass transition temperature (from about +25° C. to +100° C.), has an OH number of from about 35 to 112 mg/g, a number-average molar mass of from about 2000 to 8000 g/mol and a polydispersity of less than or equal to about 5. U.S. Pat. No. 5,098,956 does not, however, contain any indication of the branched monomer unit according to the invention, which unit is formed during the polymerization and plays a role in the blend components described herein. Furthermore, U.S. Pat. No. 5,098,956 does not disclose any "in situ" blends, since the OH numbers of the copolymers used are different.

Highly complex binder systems which comprise mixtures of oligomeric caprolactonepolyols, i.e. polyesterpolyols, with acrylatepolyols and/or acrylate star polymers also are known and described in, for example, WO 92/22618. In this document, references to the acrylatepolyols do not include any indication of the particular structural unit of the copolymers of this invention. In addition, defined organic compounds, for example aspartic acid derivatives, aldimines, ketimines or oxazolidines (EP-A-0 470 461, EP-A-0 403 921, U.S. Pat. No. 5,214,086, Robinson, et al. "High performance polyurethane coatings systems utilizing oxazolidine based reactive diluents" Hoffman, 21st Higher Solids and Waterborne Coatings Symposium (February 1994) New Orleans, La., U.S.A.), are described as reactive diluent systems or as sole binders.

For clearcoats utilized in automotive refinishing, for example, California only permits a maximum of 3.5 lb/gal (0.42 kg/dm$^3$) of volatile organic constituents, i.e. about 59% by mass of solids in the coating material (DIN 4 cup, 21 s flow time at 23° C). These regulations become stricter when a conventional basecoat is applied. In this case, the overlying clearcoat must not exceed a VOC limit of 2.1 lb/gal (0.25 kg/dm$^3$, i.e. about 75% by mass solids content). Important processing properties, for example rapid drying, are lost when polyols of extremely low molar mass are used. When the above-mentioned organic compounds are employed, there also is no guarantee of a long pot life (processing time). In addition, the partial dissolution of the basecoat and/or skinning, in some cases, causes cloudiness and gas-escape defects in the case of the rapid reactive-diluent systems. In addition, the original aim of enabling the use of the binders in pigmented systems as well as unpigmented ones is not feasible in this case.

Thus, there exists a need to develop more environmentally friendly binder systems with a low solvent content, which give rise to rapid drying, a long pot life, little or no partial dissolution of the base coat, and no skinning, cloudiness or gas-escape defects. There also exists a need to develop binder systems which permit universal use in pigmented and unpigmented systems.

SUMMARY OF THE INVENTION

It is therefore an object of the present invention to provide binder systems that do not suffer from the disadvantages associated with binders currently employed in the art. Specifically, it is an object of the invention to provide binder systems that are environmentally friendly, have a low solvent content, give rise to rapid drying, have a long pot life, have little or no partial dissolution of the base coat, and exhibit little or no skinning, cloudiness or gas-escape defects. It is an additional object of the invention to develop binder systems which permit universal use in pigmented and unpigmented systems.

Another object of the present invention is to provide low molar mass copolymers useful in preparing the aforementioned binder systems, and to provide methods of making the low molar mass copolymers and binder systems.

It has surprisingly been found that, by the use of special structures in the units of polyacrylatepolyols, it is possible to develop binder systems having the above-mentioned properties.

In accordance with these objectives, there are provided extremely low molar mass copolymers (a) which can be prepared by reacting (aa) one or more glycidyl esters of saturated aliphatic monocarboxylic acids having a tertiary or quaternary α carbon atom, and (ab) at least two unsaturated copolymerizable monomers of which at least one comprises at least one COOH group, under the conditions of a free-radical copolymerization, wherein the weight-average molar mass of the copolymers is below 3500 g/mol and the proportion of branched side chains in the copolymer is at least 20% by mass.

In accordance with additional objects of the invention, there is provided a method of making low molar mass copolymers by reacting the aforementioned (aa) and (ab). In accordance with yet another object of the invention, there are provided binders and coating compositions, adhesives or sealing systems comprising the aforementioned low molar mass copolymers.

DETAILED DESCRIPTION OF PREFERRED EMBODIMENTS

Throughout this description, those skilled in the art will recognize that use of the expression "units with side-chain branching" denotes olefinically unsaturated, copolymerizable monomers which have at least one tertiary or quaternary aliphatic carbon atom. The expressions "extremely low" or "low" insofar as they define the molar mass of the copolymers described herein are understood to denote a molar mass of less than 3,500 g/mol.

The present invention relates to binder systems which contain extremely low molar mass polyacrylatepolyols (a) containing at least 20% by mass of units with side-chain branching. The binder systems according to the invention can include proportions by mass of from 5 to 95 % of these extremely low molar mass polyacrylatepolyols (a) with from 95 to 5% of other binders (b). Preference is given in this context to those binder systems in which the chemical composition of the binder component (b) is the same as or similar to that of component (a). With particular preference, the mixtures of (a) and (b) can be prepared "in situ", i.e. from the same monomer mixture, the reaction conditions being chosen so as to yield a mixture of extremely low molar mass polymer component (a) and a higher molar mass polymer component (b). This can be achieved, for example, by an appropriate temperature regime, as is set out in more detail below. Those skilled in the art are capable of modifying the polymerization conditions to produce the desired polymer components (a) and (b) using the guidelines presented herein.

The extremely low molar mass polyacrylate polyols (a) which can be present in the novel binder system and which comprise at least 20% by mass of compounds having side-chain branching are distinguished by a weight-average molar mass at below 3500 g/mol, preferably below 3300 g/mol, and more preferably, below 3000 g/mol. In the low molar polyacrylatepolyols according to the invention, the number of free chain ends per unit volume usually is very high. Moreover, these polymers also possess chains of reduced or low functionality. This is manifested in low film hardness and extremely long drying times.

As sole binders together with curing reagents, such systems usually lead to tacky films. As a compatible blend component for higher molar mass polyacrylate resins or polyester resins of similar structural composition, however, they can be used to increase the solids content. Such binder mixtures have sufficient drying properties in the film. These transparent blends can be prepared either by the traditional method, by separate preparation followed by physical mixing, or, especially in the case of polyacrylate resins, "in situ", i.e. by drastic alteration of the reaction parameters, for example the monomer concentration (including precursors), the reaction temperature and/or the reaction pressure. The alteration of the monomer concentration also includes the addition of further monomers (including precursors). The aforementioned "in situ" preparation has the advantage of lower production costs.

When these blends are used as binders in clearcoat compositions with or without customary catalysts and additives, they lead to coating solids contents by mass of up to about 67% (DIN 53 211 4 cup, 21 s, 23° C.) with adequate dust-dry times and freedom from tack.

In accordance with the present invention, the extremely low molar mass polyacrylatepolyols (a) can be prepared by reacting (aa) one or more glycidyl esters of saturated aliphatic monocarboxylic acids having a tertiary or quaternary α carbon atom, and (ab) at least two unsaturated copolymerizable monomers, of which at least one comprises at least one COOH group, under the conditions of a free-radical copolymerization, whereby the polymer formed comprises at least 20% by mass of units with branched side chains, preferably at least 25%, and particularly preferably at least 30%.

Advantageously, products made in accordance with the present invention are obtained in particular if, in each case, proportions by mass of (aa) from 20 to 50% of glycidyl esters of aliphatic saturated monocarboxylic acids having a tertiary or quaternary α carbon atom, the esters containing 7 to 33 carbon atoms, and (ab) from 80 to 50% of at least two unsaturated copolymerizable monomers, of which at least one comprises at least one COOH group, under the conditions of free-radical copolymerization. Under these conditions, at least the component (aa), the glycidyl ester, preferably is initially introduced into the reaction vessel and reacted at from 210° to 260° C. with component (ab) together with at least one free-radical initiator in a bulk polymerization until a conversion of at least 95%, preferably at least 97.5%, is reached. Component (ab) preferably comprises at least 2.0% by mass of a monomer having at least one COOH group.

Binder mixtures containing the extremely low molar mass polyacrylates of this kind and, correspondingly, OH-functional copolymers as described in U.S. Pat. Nos. 4,145,513, 4,350,809, and 4,710,556, EP-A-0 635 523, DE-P 44 42 769 or EP-A-0 638 591, DE-P 44 15 319 and DE-P 44 35 950 are homogeneously miscible and compatible with one another. This compatibility is due in part to the similar structural units, whereby the binder mixtures can be cured to provide clear, transparent films with solids contents of up to about 67% by mass (DIN 4 cup, 21 s, 23° C.).

Particularly advantageous mixtures of the present invention are those comprising portions by mass of (a) from 5 to 95% of the above-mentioned low molar mass copolymers with (b) from 95 to 5% of copolymers of identical or similar composition having a weight-average molar mass of greater than 3500 g/mol, whose monomers comprise proportions by mass of (ba) from 5 to 50% of glycidyl esters, containing 7 to 33 carbon atoms, of aliphatic saturated monocarboxylic acids having a tertiary or quaternary α carbon atom, and (bb) from 95 to 50% of at least two unsaturated copolymerizable monomers, of which at least one comprises at least one COOH group, which are reacted with one another under the conditions of a free-radical copolymerization, the sum of the proportions by mass being in each case 100%.

These binder mixtures are preferably prepared "in situ". For this purpose, the reaction usually is performed in succession at at least two different reaction temperatures, i.e. for a period of time $t_1$ at a temperature $T_1$ and then, after the phase of heating or cooling to the new temperature, for a period of time $t_2$ at a temperature $T_2$, etc. This procedure may entail carrying out reaction first at the above-mentioned higher temperature of from 210° to 260° C. followed by cooling to a temperature below 210° C., i.e. from 100° to 210° C., preferably from 120° to 190° C. The reaction then can be continued at the lower temperature until the desired conversion is reached.

An additional in situ preparation method is to carry out the reaction first at a lower temperature and, after subsequent heating, to allow it to continue at a higher temperature. The number of cycles of heating and/or cooling in either of these procedures must be at least two. There is no upper limit on the number of cycles, but for ease of practical implementation, the number typically is from two to four. The length of each period can be varied in accordance with the desired proportions in the mixture. In the case of more than two periods of time or reaction temperatures, the temperatures may be part of a rising or falling sequence but may also be changed in a wavelike progression (e.g. high-low-high). Those skilled in the art are capable of modifying the various cycles of heating and/or cooling as well as the times of reaction to effect the desired binder mixture.

Mixtures according to the invention are advantageously obtained by reacting (aa) one or more glycidyl esters of saturated aliphatic monocarboxylic acids having a tertiary or quaternary α carbon atom, and (ab) at least two unsaturated copolymerizable monomers of which at least one comprises at least one COOH group, under the conditions of a free-radical copolymerization, wherein the overall reaction time is divided into at least two periods. Preferably, constant reaction temperatures are established in each period, and at least two different reaction temperatures are employed in total. In this instance, at least one reaction temperature preferably is between about 210° C. and 260° C. The periods of time chosen may be of any desired duration.

Within the scope of the invention, it is likewise possible to alter the composition of the monomers during the reaction by continuous or noncontinuous metering in of individual components or mixtures thereof. It is likewise possible, and in some cases even necessary depending on the choice of reaction temperatures, to employ different free-radical initiators at the different reaction temperatures.

The compounds used as component (aa) usually are glycidyl esters of α-alkylalkanemonocarboxylic acids and/or α,α-dialkylalkanemonocarboxylic acids, individually or in a mixture. Since the glycidyl radical in the glycidyl ester of the α-alkylalkanemonocarboxylic acids and/or α,α-dialkylalkanemonocarboxylic acids has the empirical formula $C_3H_5O$, the α-alkylalkanemonocarboxylic acids and α,α-dialkylalkanoic acids are isomer mixtures of α-branched aliphatic saturated monocarboxylic acids having 4 to 30 carbon atoms.

Component (ab) can be a mixture of at least two olefinically unsaturated copolymerizable monomers of which at least one comprises at least one carboxyl group. Suitable olefinically unsaturated acidic monomers of component (ab) useful in the present invention include monounsaturated monocarboxylic acids, such as acrylic and methacrylic acid, (iso)crotonic acid and vinylacetic acid; monoesters of monounsaturated dicarboxylic acids, such as monoesters of maleic, fumaric, methylenemalonic and itaconic acid with saturated aliphatic monohydric alcohols having 1 to 8 carbon atoms; monounsaturated dicarboxylic acids, such as maleic, fumaric, itaconic and mesaconic acid; and polyunsaturated fatty acids having 8 to 22 carbon atoms, for example linolenic acid, linoleic acid, oleic acid, arachidonic acid and ricinene fatty acid.

Suitable olefinically unsaturated monomers without carboxyl groups include the esters of monounsaturated monocarboxylic acids, for example esters of acrylic and/or methacrylic acid with monohydric alcohols having 1 to 20 carbon atoms. Examples of particularly suitable acrylic esters are the methyl, ethyl, propyl, 2-ethylhexyl, butyl, isobutyl, tert-butyl, hexyl, nonyl, lauryl, stearyl, 3,3,5-trimethylcyclohexyl, 4-tert-butylcyclohexyl, dihydrobicyclopentadienyl and isobornyl esters (including their structural isomers) of acrylic or methacrylic acid.

Further constituents of component (ab) can be halogenated esters, for example trifluoroethyl, pentafluoro-n-propyl and hexachlorobicycloheptenyl acrylate or methacrylate, methyl 2-fluoroacrylate or dibromophenyl 2-fluoroacrylate. Also suitable as component (ab) in the context of the present invention include small amounts of glycidyl esters of acrylic or methacrylic acid, preferably glycidyl acrylate and glycidyl methacrylate, and also monomers comprising silane groups. Typical examples of these monomers are acrylatoalkoxysilanes, such as γ-(meth) acryloyloxypropyltrimethoxysilane, γ-(meth) acryloyloxypropyltris(2-methoxyethoxy)silane, and vinylalkoxysilanes, such as vinyltrimethoxysilane, vinyltriethoxysilane and vinyltris(2-methoxyethoxy)silane. Also included in this group can be the corresponding acryloyloxysilanes of the aforementioned acrylatoalkoxysilanes.

Throughout this description, the expression "α,β-unsaturated carboxylic acids" includes the dicarboxylic acids, for example maleic acid, fumaric acid and itaconic acid and their monoesters as well. Further suitable compounds for use as component (ab) in the context of the present invention include the amides, N-substituted amides such as N-alkylamides and N,N-dialkylamides, and also nitriles of α,β-olefinically unsaturated carboxylic acids preferably having from 3 to 22 carbon atoms, and more preferably the derivatives of acrylic and methacrylic acid, such as acrylamide, methacrylamide, N,N-dimethylacrylamide, acrylonitrile and methacrylonitrile.

Additional suitable compounds for use as component (ab) in the context of the present invention include vinyl esters of aliphatic linear or branched monocarboxylic acids, such as vinyl acetate or ®Versatic acid vinyl ester (vinyl neodecanoate). Other suitable compounds are vinyl halides and vinylidene halides, such as vinyl chloride and vinylidene chloride, and vinyl ketones, such as methyl and ethyl vinyl ketone, and vinyl ethers such as methyl and isobutyl vinyl ether.

Examples of suitable hydroxyalkyl esters of α,β-unsaturated carboxylic acids having a primary hydroxyl group are hydroxyethyl acrylate, hydroxypropyl acrylate, hydroxybutyl acrylate, hydroxyamyl acrylate, hydroxyhexyl acrylate, hydroxyoctyl acrylate and the corresponding methacrylates. Examples of hydroxyalkyl esters having a secondary hydroxyl group which can be used in the present invention include 2-hydroxypropyl acrylate, 2-hydroxybutyl acrylate, 3-hydroxybutyl acrylate, trimethylolpropane diacrylate and their corresponding methacrylates. It is of course also possible in each case to employ the corresponding esters of other α,β-unsaturated carboxylic acids, for example, those of crotonic acid and of isocrotonic acid. Particularly preferred compounds are hydroxyethyl, hydroxypropyl and hydroxybutyl acrylate and/or methacrylate. Also suitable are reaction products of, for example, one mole of hydroxyethyl acrylate and/or hydroxyethyl methacrylate and on average two moles of ε-caprolactone, or esters of α,β-unsaturated carboxylic acids and the oligomeric alkylene glycols, such as oligoethylene glycol or oligopropylene glycol. Other suitable olefinically unsaturated monomers include aromatic vinyl hydrocarbons, such as styrene, (alkylphenyl)ethylenes, α-methylstyrene, α-chlorostyrene and the various vinyltoluenes, and also vinylnaphthalene.

In the mixture of starting monomers, component (ab) preferably comprises a mixture with contents by mass of (ab1) from 2 to 25%, preferably from 4.5 to 20%, of an α,β-unsaturated monocarboxylic acid, preferably acrylic acid or methacrylic acid or mixtures thereof, (ab2) from 0 to 45%, from 10 to 40%, of one or more hydroxyalkyl or hydroxyalkoxyalkyl esters of α,β-unsaturated monocarboxylic acids, (ab3) from 0 to 90%, preferably from 5 to 70%, of one or more esters of acrylic or methacrylic acid with a monohydric alcohol having 1 to 20 carbon atoms, and (ab4) from 0 to 90%, preferably from 20 to 85% by weight, of at least one aromatic vinyl compound, the sum of the proportions by mass of components (ab1), (ab2), (ab3) and (ab4) being 100% and at least one of each of components (ab2) to (ab4) being present in admixture with component (ab1).

During the polymerization reaction, the acidic monomers and the initially charged glycidyl ester combine to form a reaction product whose proportion by mass in the copolymer obtained in accordance with the invention is in general from 20 to 60%, preferably from 20 to 50%. The reaction can be carried out with or without catalysis. If catalysis is carried out, examples of suitable catalysts for use in the present invention include alkali metal, alkaline earth metal or transition metal compounds, such as compounds of sodium, lithium, potassium, calcium, vanadium, zirconium and titanium.

The proportion by mass of the initiators used in the present invention can, for example, be from 0.5 to 5%, preferably up to 4%, more preferably up to 3%, based on the overall mass of the starting components. Customary regulators, such as mercaptans or thiols, can also be employed. For the copolymers according to the present invention, suitable polymerization initiators are the customary radical-forming compounds, individually or in a mixture. Examples of such compounds include aliphatic azo compounds, diacyl peroxides, peroxydicarbonates, alkyl peresters, alkyl hydroperoxides, perketals, dialkyl peroxides or ketone peroxides. Dialkyl peroxides are preferred, such as di-t-butyl peroxide or di-t-amyl peroxide. The initiators can be added together with the monomers or separately. During the polymerization, further amounts of initiators can be added, alone or mixed with regulators. In accordance with the invention, however, it is preferred not to employ any regulators.

The polymerization preferably is carried out in bulk (as "mass polymerization" at the end of polymerization). The term "bulk polymerization," as it is used in the context of the present invention, denotes a polymerization which is carried out in general without solvents. In some cases, however, it is possible for a small proportion by mass of solvent to be present, namely up to 20%, preferably up to 10% and, in particular, up to 8%, based on the mass of the starting components. Such polymerizations can also be carried out under elevated pressure. However, preference is given to working without solvents in the present invention.

The processes according to the invention can be carried out discontinuously ("batch" process) or continuously. Particular preference is given to a procedure in which, first of all, at least one component (aa) is initially charged to the reaction vessel at the beginning of polymerization and, subsequently, at least two unsaturated copolymerizable monomers (ab) are added of which at least one comprises a COOH group. The component (aa) can be, during the polymerization, incorporated completely into the copolymer.

Hydroxyl-containing copolymers prepared in accordance with this aspect of the invention can subsequently be modified further, for example, by reaction with isocyanate compounds which contain per molecule on average from 0.8 to 1.5 free NCO groups and at least one tertiary amino group. In this case, the solvent employed in the polymerization, i.e. in the preparation of the polymers, must of course be inert toward these isocyanate compounds.

These isocyanate compounds also include, for example, all low molar mass urea derivatives which lead in the coating industry to "sag controlled" acrylate resins. In this context, reaction products of monoamines and/or polyamines and/or substances having at least one amino group with mono- and/or polyisocyanates and/or polymeric substances having at least one isocyanate group can be added to the hydroxyl-containing copolymers as viscosity regulators. These reaction products can be prepared separately and stirred into the copolymers or mixtures. Preferably, however, reaction takes place directly in the copolymers or mixtures.

A feature of the extremely low molar mass polymers according to the invention is their content of OH groups. Typically, these polymers have an OH number of from 20 to 250 mg/g, preferably from 30 to 200 mg/g and, more preferably, from 40 to 180 mg/g. Furthermore, the polymers may possess a particularly low solution viscosity, which usually ranges from about 3 to 200 mPas, preferably from about 5 to 100 mPas and, in particular, from 10 to 50 mPas (measured in a 50% strength solution in butyl acetate at 23° C. in accordance with DIN 53018). The novel polymers of the present invention advantageously possess a weight-average molar mass of below 3500 g/mol, preferably below 3300 g/mol and, in particular, below 3000 g/mol. The polydispersity U ($U=M_w/M_n$) of the polymers of the present invention preferably is less than 2.8, in particular less than 2.5.

The extremely low molar mass, OH-functional acrylate polymers according to the invention can be diluted to a selectable extent with freely selectable solvents or solvent mixtures. The copolymers (a) according to the invention, alone and in mixtures, are particularly suitable for coatings applications in both one and two component systems. The copolymers (a) of the invention are especially suitable for high-solids systems, i.e. for solvent-containing mixtures of high solids content.

Examples of suitable solvents for the use with the novel copolymers (a) include: aliphatic, cycloaliphatic and aromatic hydrocarbons, such as alkylbenzenes, for example xylene, toluene; esters, such as ethyl acetate, butyl acetate, acetates with longer alcohol residues, butyl propionate, pentyl propionate, ethylene glycol monoethyl ether acetate, the corresponding methyl ether acetate, or propylene glycol methyl ether acetate; ethers, such as ethylene glycol acetate monoethyl, methyl or butyl ether; glycols; alcohols; ketones, such as methyl isoamyl ketone or methyl isobutyl ketone; lactones, and mixtures of such solvents. Other solvents which can be employed in the present invention include reaction products of lactones with glycols or alcohols.

The present invention additionally relates to coating compositions which comprise the novel copolymers as binder components. The individual components and mixtures can be cured, in the presence of appropriate crosslinking agents, without heating or with heating at elevated temperature. Suitable curing components in these coating compositions include amino resins, polyisocyanates, or compounds containing anhydride groups, individually or in combination. The crosslinking agent in each case can be added in an amount such that the molar ratio of the OH groups of the copolymer to the reactive groups of the crosslinking agent is between 0.3:1 and 3:1.

Amino resins which are suitable as curing components are preferably urea resins, melamine resins and/or benzoguanamine resins. These resins usually are etherified condensation products of urea, melamine or benzoguanamine, respectively, with formaldehyde. Suitable mixing ratios typically are in the range from 50:50 to 90:10 of copolymer (or a mixture comprising the copolymer)/amino resin crosslinking agent, based on the mass of the solid resin. Appropriate phenolic resins and their derivatives can also be employed as curing agents. In the presence of acids, for example p-toluenesulfonic acid, these crosslinking agents bring about curing of the coating. Hot-curing can be undertaken in the customary manner at temperatures of from about 90° to 200° C. in, for example, from 10 to 30 minutes.

Suitable compounds for curing the products according to the invention, with crosslinking, include, for example, polyisocyanates, especially at moderate temperatures or at room temperature. Polyisocyanate components which are suitable in principle include all aliphatic, cycloaliphatic or aromatic polyisocyanates which are known from polyurethane chemistry, individually or in mixtures. Particularly preferably examples of these polyisocyanate components include low molar mass polyisocyanates, for example hexamethylene diisocyanate, 2,2,4-and/or 2,4,4-trimethyl-1,6-hexamethylene diisocyanate, dodecamethylene diisocyanate, tetramethyl-p-xylylene diisocyanate, 1,4-diisocyanatocyclohexane, 1-isocyanato-3,3,5-trimethyl-5-isocyanatomethylcyclohexane (IPDI), 2,4'- and/or 4,4'-diisocyanatodicyclohexylmethane, 2,4'- and/or 4,4'-diisocyanatodiphenylmethane or mixtures of these isomers with their higher homologs. Those skilled in the art recognize that these polyisocyanates are obtainable in a manner known per se, for example, by phosgenization of aniline/formaldehyde condensation products, 2,4- and/or 2,6-diisocyanatotoluene, or any desired mixtures of such compounds.

It is preferred, however, to employ derivatives of these simple polyisocyanates as are customary in coatings technology. These include polyisocyanates which contain, for example, biuret, uretdione, isocyanurate, urethane, carbodiimide or allophanate groups, as are described for example in EP-A 0 470 461. Particularly preferred modified polyisocyanates include N,N',N"-tris(6-isocyanatohexyl)biuret and mixtures thereof with its higher homologs, and also N,N', N"-tris(6-isocyanatohexyl) isocyanurate and/or mixtures thereof with its higher homologs containing more than one isocyanurate ring. For curing at elevated temperature, capped polyisocyanates, polycarboxylic acids and/or their anhydrides also are suitable.

The copolymers according to the invention are particularly suitable for producing high-solids solvent-containing clearcoats and topcoats and for fillers. Coating compositions which can be prepared with the copolymers according to the present invention may also comprise other auxiliaries and additives which are customary in coatings technology which have not yet been mentioned. These include, in particular, catalysts, leveling agents, silicone oils, plasticizers, such as phosphates and phthalates, pigments, such as iron oxides, lead oxides, lead silicates, titanium dioxide, barium sulfate, zinc sulfide, phthalocyanine complexes, etc., and fillers, such as talc, mica, kaolin, chalk, ground quartz, ground asbestos, ground slate, various silicic acids, silicates, etc., viscosity-controlling additives, matting agents, UV-absorbers and light stabilizers, antioxidants and/or peroxide scavengers, antifoams and/or wetting agents, active diluents/reactive diluents and the like. Those skilled in the art are capable of formulating a coating composition containing the copolymers of the present invention, together with any of the known additives, in accordance with the guidelines provided herein.

The coating compositions of the invention can be applied to the respective substrate by known methods, for example, by brushing, dipping, flow-coating or with the aid of rollers or blades, but in particular by spraying. They can be applied with heating, and if desired, can be brought into a readyto-apply form injection of supercritical solvents (e.g. $CO_2$). Binders or binder mixtures prepared with the novel copolymers of the invention also can be used to obtain automotive refinishes, industrial coatings, wood finishes, plastics finishes, constructional coatings and textile coatings having outstanding properties. These binders can be employed for the preparation of both intermediate coats and pigmented or nonpigmented topcoats. For this purpose, the coating materials are in general cured within the temperature range from about −20° to +100° C., and preferably from about −10° to +80° C.

The invention is illustrated in more detail in the Examples which follow. In the working examples, all percentages are by mass.

EXAMPLES

EXAMPLE I

Preparation of the copolymers

Ia Preparation of low molar mass copolymers

The glycidyl ester of an α,α-dialkylalkanemonocarboxylic acid [e.g. glycidyl ester of Versatic 10 acid (trade name: Cardura® E 10, Shell Chemicals)] (in some cases with solvent or solvent mixtures) was charged to a reactor which was fitted with a stirrer mechanism, an inert gas inlet, a heating and cooling system and a metering device, and then heated under inert gas to the desired temperature. The monomer mixture (in some cases with solvent or solvent mixtures), together with or separately from the initiator (in some cases in solvent or solvent mixtures), was then metered in uniformly over the course of 6 hours. Polymerization was continued for 2 hours.

Ib Preparation of an "in situ" blend

The glycidyl ester of an α,α-dialkylalkanemonocarboxylic acid [e.g. glycidyl ester of Versatic 10 acid (trade name: Cardura® E 10, Shell Chemicals)] was charged to a reactor which was fitted with a stirrer mechanism, an inert gas inlet, a heating and cooling system and a metering device, and then heated under inert gas to the desired temperature ($\geq 210°$ C.). The monomer mixture (in some cases with solvent or solvent mixtures), together with or separately from the initiator (in some cases in solvent or solvents mixtures), was then metered in uniformly over the course of 6 hours.

After a metering time of 2 hours, the reaction temperature was lowered to below 210° C. and polymerization was continued. After the end of metering, polymerization was continued at 140° C. for 2 hours. The copolymers or "in situ" blends were diluted in appropriate solvents or solvent mixtures.

The following copolymers and blends, as shown in Table 1, were prepared. The precise batches in terms of parts by weight, the reaction conditions and the characteristics of the products all are shown in the following Tables.

TABLE 1

Preparation and properties of a copolymer (Ia) and "in situ" blend (Ib)

| Batch | Ia | Ib |
|---|---|---|
| organic compounds: | | |
| glycidyl ester | 26.81 | 27.2 |
| acrylic acid | — | 7.9 |
| methacrylic acid | 9.3 | — |
| hydroxyethyl methacrylate | 20.6 | 20.9 |

TABLE 1-continued

Preparation and properties of a copolymer (Ia) and "in situ" blend (Ib)

| Batch | Ia | Ib |
|---|---|---|
| methyl methacrylate | — | 6.8 |
| styrene | 43.3 | 37.2 |
| Initiator | Di-tert-amyl peroxide 1.95% | |
| Polymerization | | |
| Temperature/time | 235° C./6 h | 225° C./2 h - 170° C./4 h |
| Subsequent reaction | 230° C./2 h | 140° C./2 h |
| SC (%) s.f. (in butyl acetate) | 68.5 | 70.7 |
| Characteristics: | | |
| Acid number (mg/g) | 10.1 | 13.4 |
| Hydroxyl number (mg/g) | 146 | 150 |
| Viscosity (mPas), 23° C. (s.f.) | 215 | 1185 |
| Viscosity (mPas), 23° C. (50% in BuOAc) | 15 | 36 |
| GPC (PS calibration) | unimodal | multimodal |
| $M_w$ (g/mol) | 1770 | 3580 |
| $M_n$ (g/mol) | 1050 | 1275 |
| $U = M_w/M_n$ | 1.7 | 2.8 |
| Appearance | transparent | transparent |

Sc: Solids content proportion by mass
s.f.: Supply form
BuOAc: Butyl acetate
GPC: for determining $M_w$, $M_n$ - Millipore ® Waters chromatography system 860
Pump: Waters Model 590, RI detector: Waters Model 410
Column packing: Waters Ultrastyragel 1 × 1000 Å + 1 × 500 Å + 1 × 100 Å (angströms)
Solvent: Tetrahydrofuran at 40° C.
Flow rate: 1 ml/min, concentration: 1% based on solids
Calibration: Polystyrene (from PSS, Mainz)
Determination of the properties: Acid number, hydroxyl number and viscosity (standards: see "Analytical determination methods" brochure from Hoechst AG Kunstharze, 1982 edition)

The copolymer Ia prepared was of extremely low molar mass and had very low solution viscosities. The product was highly uniform (U<2). The "in situ" blend Ib prepared was multimodal (U>2.5). It possessed a higher solution viscosity. The terms 'unimodal' and 'multimodal' refer to GPC curves having one peak and more than one peak or a peak with a shoulder, respectively.

EXAMPLE II

Preparation of the coating materials

The curable coating compositions according to the present invention were prepared by mixing the components, (i) a copolymer according to the invention or a mixture of two or more copolymers according to the invention or other copolymers, with (ii) the auxiliaries and additives, solvents and crosslinking agents, in the described mixing ratio (Table 2), adjusting the mixture using further diluent, to the spray viscosity of from 21 to 22 seconds with the flow cup (DIN 52211, 4 mm, 23° C.). In the case of copolymer components of low viscosity, this can be carried out without solvent, with heating to higher temperatures if desired. Products of higher viscosity were, if the curable mixtures were not employed as a powder coating, dissolved or dispersed in the diluents mentioned prior to mixing. In the case of pigmented systems, first of all a dispersion unit of appropriate construction was used to produce a pigment paste in a dispersion step from the corresponding pigments together with the novel copolymer or with a mixture of two or more novel or other copolymers, with or without the addition of a suitable specific grinding resin. The pigment paste was mixed as is, or with the addition of further binder based on the components, or a mixture thereof, or mixed with a foreign resin which is compatible with the other components of the coating system, and the mixture was made up by adding further diluents or typical coatings additives. The pot life and the properties of the resulting films depended on the process conditions, i.e., on the nature and amount of the starting materials, metering of the catalyst, temperature regime etc. Curing could be carried out noncontinously or continuously, for example by means of an automatic coating apparatus.

EXAMPLE III

Performance testing

IIIa Clearcoats

The coating systems prepared as in Example II were applied to clean glass plates using a 100 μm doctor blade, and the applied coatings were tested under the conditions of air drying.

TABLE 2

Preparation of the high-solids clearcoats with binder blends
The high molar mass blend component used was the copolymer of Example A2 of DE-P 43 24 801.

| Binder | Copolymer | Blend | Copolymer | "in situ" blend |
|---|---|---|---|---|
| Batch | Comparison A2 DE 43 24 801 | 50:50 A2:Ia | Ia | Ib |
| Appearance: | transparent | transparent | transparent | transparent |
| SC in % | 70 | 69.3 | 68.5 | 70.7 |
| OH number/w(OH) in % | 136/4.1 | 141/4.2 | 146/4.4 | 150/4.5 |
| Visc., mPas (50% BuOAc) | 91 | 53 | 15 | 36 |
| Binder | 82 | 82 | 82 | 82 |
| Tinuvin ® 292 | 0.5 | 0.5 | 0.5 | 0.5 |
| Tinuvin ® 1130 | 1.5 | 1.5 | 1.5 | 1.5 |
| Si oil LO 50% 10% strength | 1 | 1 | 1 | 1 |
| Solvesso ® 100 | 1.5 | 1.5 | 1.5 | 1.5 |
| Xylene | 2.5 | 2.5 | 2.5 | 2.5 |
| BuOAc | 11 | 11 | 11 | 11 |
| Desmodur ® N 3390 | 29.9 | 32.7 | 34.3 | 35.2 |
| Flow cup (DIN 53 211) Seconds | 21 | 21 | 21 | 21 |
| Coating designation | Coating 1 Comparison | Coating 2 | Coating 3 | Coating 4 |

Solvesso ® 100 Solvent mixture of aromatic compounds with different substituents (Exxon Chemical)
Tinuvin ® 292 "HALS" (Ciba Geigy, Basel)
Tinuvin ® 1130 UV absorber (Ciba Geigy, Basel)
Si oil LO 50% Leveling agent (silicone oil from Wacker GmbH, Burghausen)
Desmodur ® N 3390 Polyisocyanate containing isocyanurate groups (from Bayer AG, Leverkusen)
BuOAc Butyl acetate
w(OH) Proportion by mass of hydroxyl groups.

After the above standard predilution, the clearcoats were adjusted with different quantities of diluent [Solvesso® 100/xylene/butyl acetate (2:3:10)] to 21 seconds.

TABLE 3

Performance testing of the high-solids clearcoats with binder blends

| Coating designation | Comparison Coating 1 | Coating 2 | Coating 3 | Coating 4 |
|---|---|---|---|---|
| Appearance | transparent | transparent | transparent | transparent |
| Initial/pot life | >8 h | >8 h | >8 h | >8 h |
| Dust-dry time | 10' | 33' | >6 h | 29' |
| Tack-free drying | 196' | 315' | >8 h | 281' |
| SC - 1 h 125° C. in % | 57.3 | 62.7 | 67.9 | 62.5 |
| Pendulum hardness after | | | | |
| 24 h | 90 | 27 | 7 | 33 |
| 2 d | 185 | 58 | 14 | 71 |
| 4 d | 195 | 92 | 39 | 95 |
| 10 d | 211 | 207 | 156 | 201 |

TABLE 3-continued

Performance testing of the high-solids clearcoats with binder blends

| Coating designation | Comparison Coating 1 | Coating 2 | Coating 3 | Coating 4 |
|---|---|---|---|---|
| Premium-grade gasoline after 10 d in min. | >30 | >30 | >10 | >30 |

Pendulum hardnesses according to König (seconds)
SC solids Content determined in accordance with DIN 53 216
d days, ' minutes Summary Clearcoats based on blends, i.e., mixtures of the novel, extremely low molar mass polyacrylatepolyols, with normal high-solids polyacrylatepolyols exhibited an increase in solids content of up to 9.4% for the same spray viscosity. The resistance to premium-grade gasoline was very good. The drying properties were classed as sufficient. The resistance and drying properties in the case of the sole binder, extremely low molar mass polyacrylatepolyol, were inadequate, although the solids content was increased by 18.5% with the same spray viscosity.

IIIb Pigmentability of the coating materials

The measure used for the pigmentability of the coating materials was the "oil uptake" to the wetting point (Glasurit Handbook "Lacke und Farben", 10th edition, pp. 144 f. (1969)). A defined quantity (from 5 to 10 g) of Kronos 2310 white pigment (from Kronos Titan GmbH, Leverkusen) was taken, and an about 70% solution of the binder (copolymer A2, copolymer Ia) or of the mixture ("in situ" blend Ib) was added dropwise and was worked in thoroughly with the spatula after each drop. The wetting point was achieved when the mass began to form lumps and took on a dark appearance (Table 4).

TABLE 4

Pigmentabillty - wetting point of the binder systems (proportion by mass in %, based on solids)

| System | Copolymer A2 (comparison) DE-P 43 24 801 | Copolymer Ia | "in situ" blend Ib |
|---|---|---|---|
| Wetting point Binder (solids content by mass) | 19.1 | 17.6 | 18.5 |

Summary

From the above table, it is clear to see that the comparison polymer consumed the most binder in order to reach the wetting point. The copolymer Ia consumed the least binder, but its drying in the clearcoat was deficient. Sufficiently rapid drying and good pigmentability were shown by the "in situ" blend Ib.

While the invention has been described with reference to particularly preferred embodiments and the examples, those skilled in the art will appreciate that various modifications can be made to the invention without significantly departing from the spirit and scope thereof. All of the aforementioned documents are incorporated by reference herein in their entirety.

What is claimed is:

1. A polymer mixture comprising proportions by mass of:
   (a) from 5 to 95% of at least one low molecular weight copolymer prepared by reacting:
      (aa) one or more glycidyl esters of saturated aliphatic monocarboxylic acids having a teritary or quaternary α carbon atom; and
      (ab) at least two unsaturated copolymerizable monomers of which at least one comprises at least one COOH group; under the conditions of free-radical copolymerization, wherein the weight average molar mass of the copolymer is below 3500 g/mol and the proportion of branched side chains in the copolymer is at least 20% by mass; and
   (b) from 95 to 5% of at least one hydroxyl-containing copolymer or polyester having a weight-average molecular mass of greater than 3500 g/mol;
wherein the sum of the proportions by mass is 100%.

2. A polymer mixture comprising proportions by mass of:
   (a) from 5 to 95% of at least one low molecular weight copolymer prepared by reacting:
      (aa) one or more glycidyl esters of saturated aliphatic monocarboxylic acids having a teritary or quaternary alpha carbon atom; and
      (ab) at least two unsaturated copolymerizable monomers of which at least one comprises at least one COOH group; under the conditions of free-radical copolymerization, wherein the weight average molar mass of the copolymer is below 3500 g/mol and the proportion of branched side chains in the copolymer is at least 20% by mass; and
   (b) from 95 to 5% of at least one copolymer of similar composition having a weight-average molecular mass of greater than 3500 g/mol whose monomers comprise proportions by mass of;
      (ba) from 5 to 50% of glycidyl esters of aliphatic saturated monocarboxylic acids having a tertiary or quaternary α carbon atom, said glycidyl esters having 7 to 33 carbon atoms, and
      (bb) from 95 to 50% of at least two unsaturated copolymerizable monomers of which at least one comprises at least one COOH group, said monomers (ba) and (bb) being reacted with one another under the conditions of a free-radical copolymerization,
wherein the sum of the proportions by mass of (a) and (b) is 100%.

3. A binder for coatings, comprising a polymer mixture as claimed in claim 1.

4. A binder for coatings, comprising a polymer mixture as claimed in claim 2.

* * * * *